(12) United States Patent
Wada

(10) Patent No.: US 7,702,539 B2
(45) Date of Patent: Apr. 20, 2010

(54) PICTURE ORDER RECEIVING APPARATUS AND A PICTURE PROCESSING SYSTEM

(75) Inventor: Yuichi Wada, Wakayama (JP)

(73) Assignee: Noritsu Koki Co., Ltd., Wakayama (JP)

( * ) Notice: Subject to any disclaimer, the term of this patent is extended or adjusted under 35 U.S.C. 154(b) by 1040 days.

(21) Appl. No.: 11/220,413

(22) Filed: Sep. 7, 2005

(65) Prior Publication Data

US 2006/0050323 A1 Mar. 9, 2006

(30) Foreign Application Priority Data

Sep. 9, 2004 (JP) ............................. 2004-262660

(51) Int. Cl.
*G06Q 99/00* (2006.01)
(52) U.S. Cl. ..................... 705/24; 705/500; 705/16
(58) Field of Classification Search .............. 705/16, 705/24, 500
See application file for complete search history.

(56) References Cited

U.S. PATENT DOCUMENTS

| | | | |
|---|---|---|---|
| 5,768,142 A | 6/1998 | Jacobs | |
| 5,845,256 A | 12/1998 | Pescitelli et al. | |
| 6,456,331 B2 * | 9/2002 | Kwoh | 348/465 |
| 6,718,123 B1 * | 4/2004 | Massarsky | 386/117 |
| 6,985,673 B2 * | 1/2006 | Molldrem, Jr. | 396/2 |
| 7,265,776 B2 * | 9/2007 | Enzo | 348/96 |
| 7,599,854 B1 * | 10/2009 | Baum et al. | 705/26 |
| 2002/0039193 A1 | 4/2002 | Kondo et al. | |
| 2002/0118949 A1 * | 8/2002 | Jones et al. | 386/68 |
| 2003/0164822 A1 | 9/2003 | Okada | |
| 2004/0195455 A1 * | 10/2004 | Maida | 244/129.1 |
| 2004/0215477 A1 * | 10/2004 | Martin et al. | 705/1 |
| 2005/0005061 A1 * | 1/2005 | Robins | 711/104 |
| 2005/0047777 A1 * | 3/2005 | Molldrem, Jr. | 396/564 |

(Continued)

FOREIGN PATENT DOCUMENTS

JP 11-219105 A 8/1999

(Continued)

OTHER PUBLICATIONS

Anon., "InterBold Releases Next-Generation Money Machines Oct. 14, 1991," Newsbytes, Oct. 14, 1991.*

(Continued)

*Primary Examiner*—Nicholas D Rosen
(74) *Attorney, Agent, or Firm*—Smith Patent Office

(57) ABSTRACT

A picture order receiving apparatus is provided with a monitor constructed by a touch panel unit for displaying order screens including operation descriptive texts describing methods for inputting a print order or the like and displaying operation keys used to input various operation commands by touching corresponding parts of the order screens; an order screen information storage for saving the operation descriptive texts prepared in a plurality of languages, a selecting screen displaying section for causing the monitor to display a language selecting screen, and an order screen displaying section for reading the operation descriptive text in the language selected on the language selecting screen from the order screen information storage and causing the monitor to display it. The operation descriptive texts can be displayed on the monitor in the language selected by an orderer when an order is received by the picture order receiving apparatus.

16 Claims, 11 Drawing Sheets

U.S. PATENT DOCUMENTS

| | | | |
|---|---|---|---|
| 2005/0062859 A1* | 3/2005 | Gibeley et al. | 348/231.99 |
| 2005/0091063 A1* | 4/2005 | Bergemann et al. | 704/275 |
| 2005/0117032 A1* | 6/2005 | Ueda et al. | 348/231.4 |

FOREIGN PATENT DOCUMENTS

| | | |
|---|---|---|
| JP | 2002-259417 A | 9/2002 |
| JP | 2003-030287 A | 1/2003 |
| JP | 2003-214889 A | 7/2003 |

OTHER PUBLICATIONS

Anon., "Leo Burnett Announces the World's Best Commercial of All Time," PR Newswire, p628NYF077, Jun. 28, 1996.*

Anon., "Ei Page One Adds Translation Citations," Information Today, vol. 9, No. 7, p. 20, Jul.-Aug. 1992.*

Anon., "Futureworld," Credit Union Management, vol. 15, No. 10, p. 36-37, Oct. 1992.*

Anon., "Government Watch: Canadian Researchers Deplore Lack of Focus on Elderly, Disabled," Inside IVHS, vol. 3, No. 21, Oct. 25, 1993.*

Anon., "Alamo Offers Multlingual Rental Agreements at Locations Throughout U.S., Canada and Europe," PR Newswire, Jun. 9, 1995.*

Notice of Reasons for Rejection directed to Japanese Patent Application No. 2004-254583, dated Dec. 11, 2009; 3 pages.

* cited by examiner

FIG.1
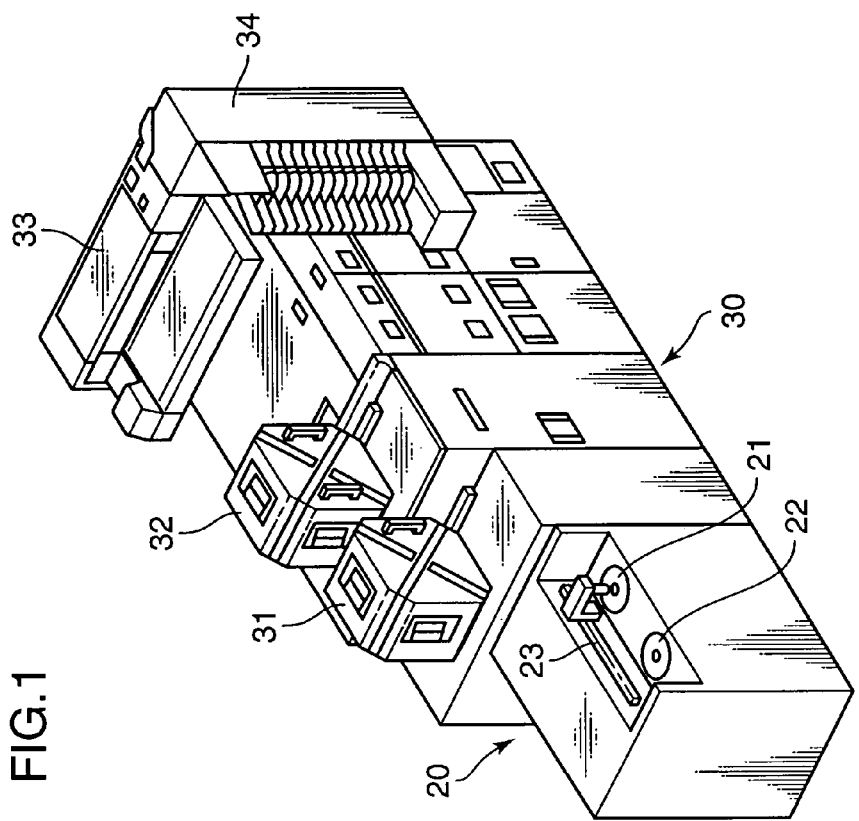
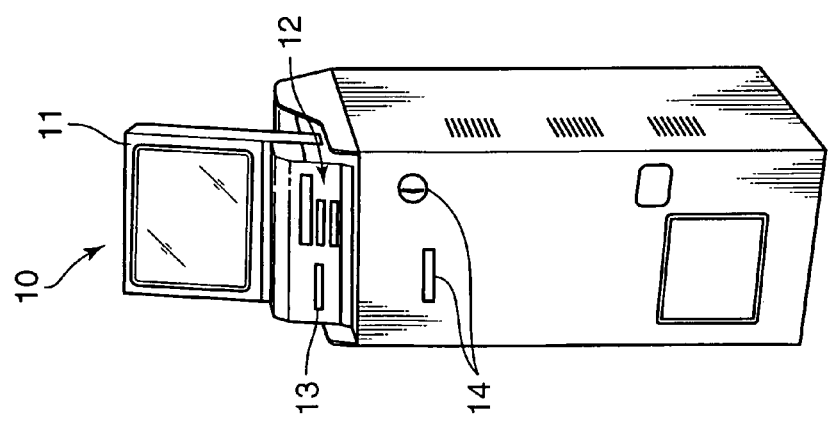

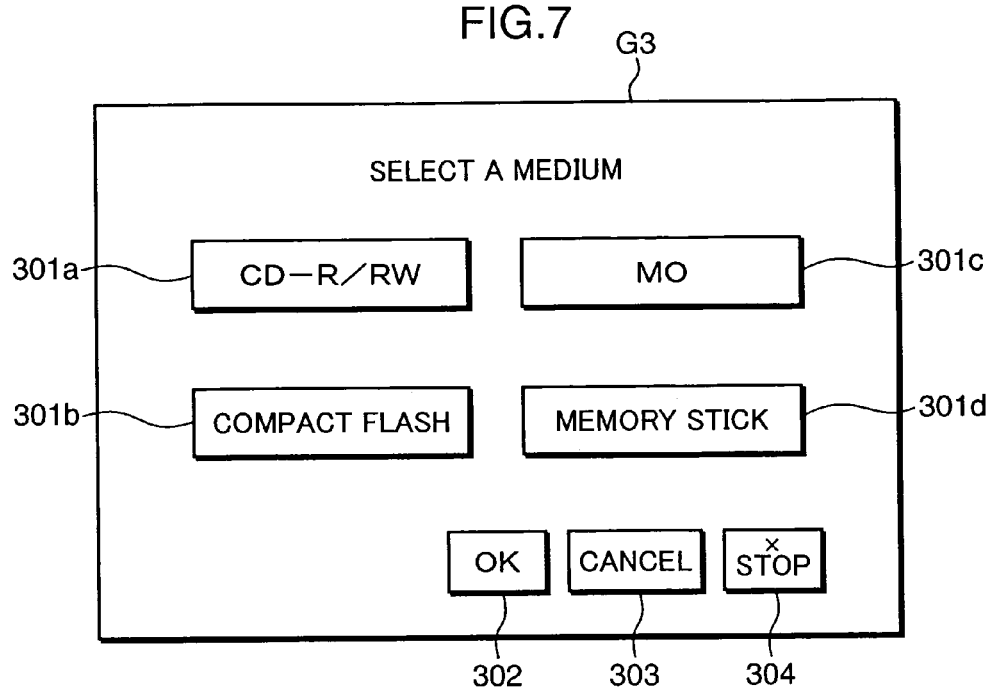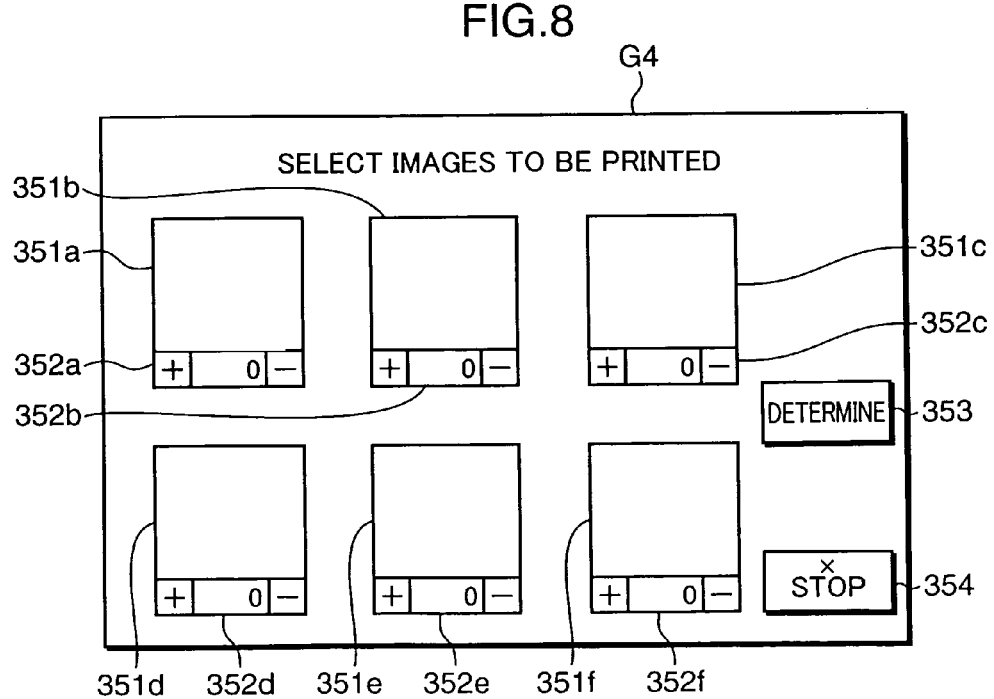

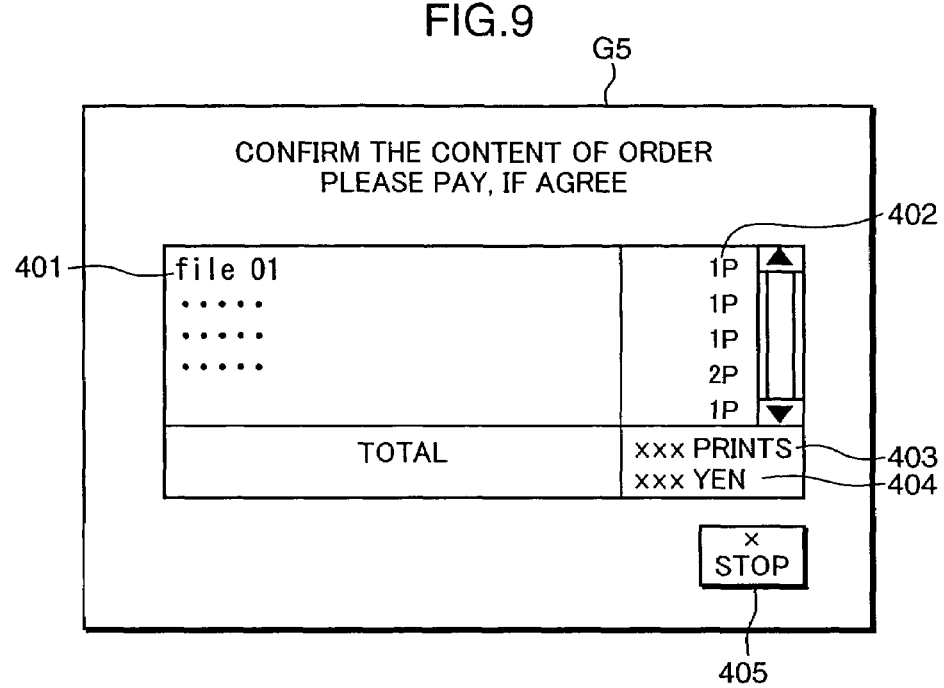
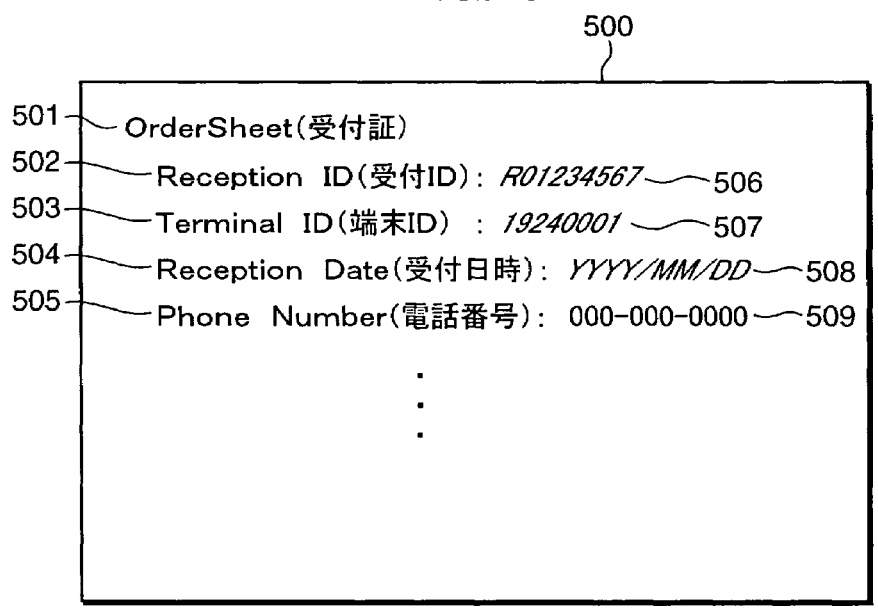

PICTURE ORDER RECEIVING APPARATUS AND A PICTURE PROCESSING SYSTEM

BACKGROUND OF THE INVENTION

Field of the Invention

The present invention relates to a picture order receiving apparatus for receiving order information for recording image data relating to photographing and recorded in an external storage medium in another type of a recording medium, and a picture processing system provided with the picture order receiving apparatus for recording the image data in another type of a storage medium in accordance with order information received by the picture order receiving apparatus.

In recent years, with the spread of digital cameras and mobile phones provided with a camera function, photo shops/studios and DP shops have been offering a picture print service of printing image data relating to photographing and saved in an external storage medium such as a small-size memory card as pictures and a service of rerecording image data in another storage medium such as a CD.

It is also known that a receiving terminal enabling an input operation by a client himself is installed at the shop front depending on the shop and the client is let to perform operations from the setting of a small-size memory card to the ordering of picture prints in accordance with operation guiding screens displayed on a monitor of the receiving terminal.

However, since operation guiding texts are displayed in Japanese, it has been difficult for people whose native languages are not Japanese such as foreign travelers to operate the receiving terminal to receive a picture print service and other services. In the case that this receiving terminal is installed in a foreign country as well, it is likewise difficult for people who do not understand the local language such as travelers to use this terminal.

SUMMARY OF THE INVENTION

It is an object of the present invention to provide a picture order receiving apparatus and a picture processing system which are free from the problems residing in the prior art.

It is another object of the present invention to provide a picture order receiving apparatus which is easily operable regardless of the native language of an orderer and a picture processing system provided with this picture order receiving apparatus.

According to an aspect of the present invention, a picture order receiving apparatus is provided with an input unit, a monitor for displaying images, a loading unit for accepting an external storage medium having image data relating to photographing recorded therein, and an operation descriptive text storage device for saving operation descriptive texts prepared in a plurality of languages. The operation descriptive text is displayed on the monitor to show an operation of receiving an order to record the image data recorded in the external storage medium in another type of a storage medium by means of the input unit.

The picture order receiving apparatus is further provided with a selecting screen displaying device for displaying a language selecting screen on the monitor; and an operation screen displaying device for reading the operation descriptive text in the language selected by the input unit from the operation descriptive text storage device and displaying it on the monitor.

These and other objects, features, aspects and advantages of the present invention will become more apparent upon a reading of the following detailed description and accompanying drawings.

BRIEF DESCRIPTION OF THE DRAWINGS

FIG. 1 is a perspective view showing a picture processing system according to an embodiment of the invention;

FIG. 7 is a diagram showing a medium selecting screen to be displayed on the monitor;

FIG. 8 is a diagram showing an image listing screen to be displayed on the monitor;

FIG. 9 is a diagram showing a charge calculating screen to be displayed on the monitor;

FIG. 10 is a diagram showing an order sheet printed by a printer;

DETAILED DESCRIPTION OF THE PREFERRED EMBODIMENTS OF THE INVENTION

Figure 2:
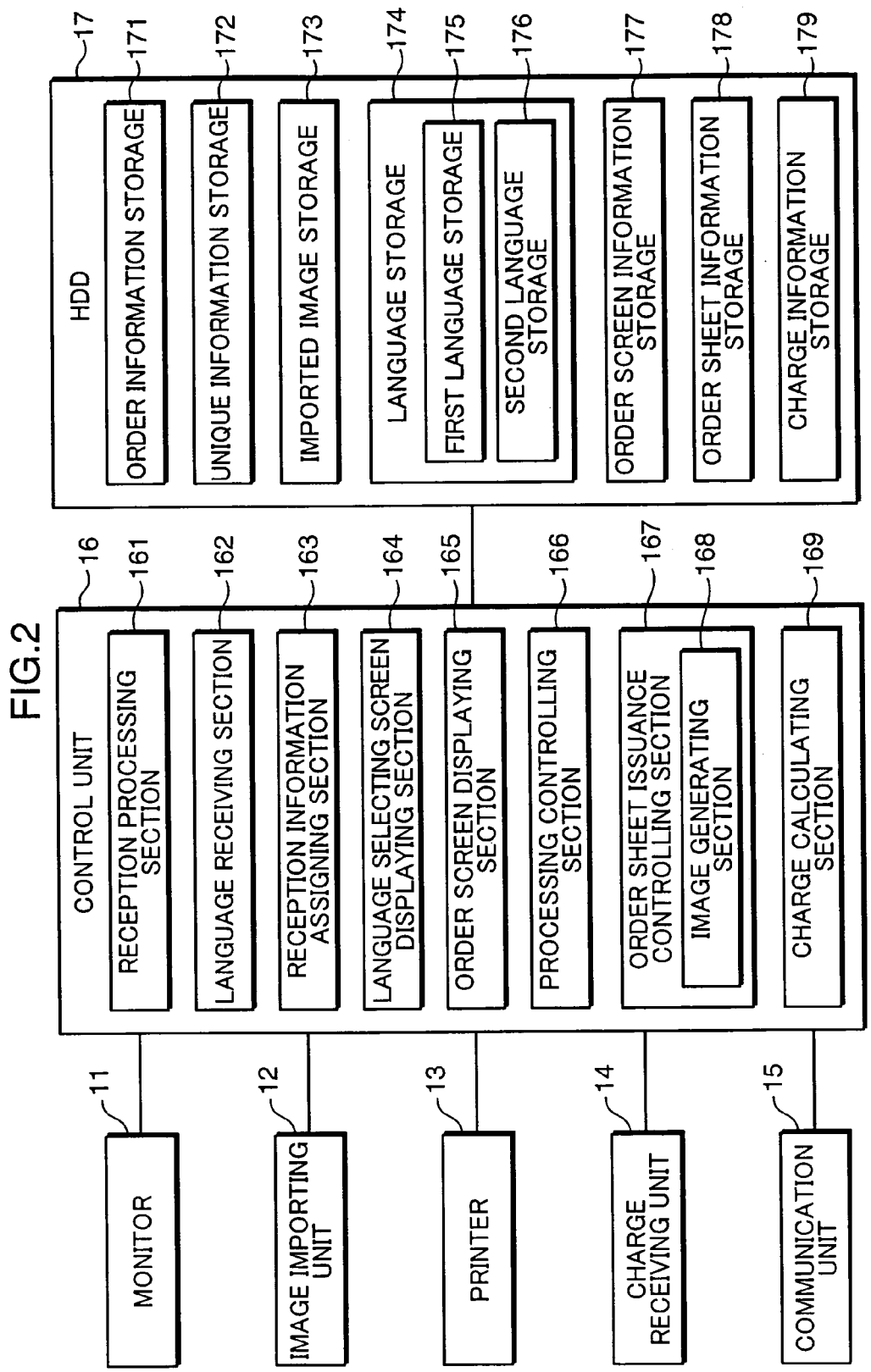
FIG. 2 is a block diagram showing a construction of a control unit of a receiving apparatus of the picture processing system.

Referring to FIG. 1 showing a picture processing system embodying the invention, the picture processing system is provided with a receiving apparatus 10, a CD processing apparatus 20 and a digital printer 30. The receiving apparatus 10 includes a monitor 11, an image importing unit 12, a printer 13, a charge receiving unit 14, and a communication unit 15. The monitor 11 displays order screens used to input various instructions at the time of a printing operation, etc. and imported images. The image importing unit 12 is constructed such that various types of media (external storage media) such as CD-R/RWs (recordable/rewritable compact disks) and small-size memory cards are insertable thereinto and ejectable therefrom and adapted to import image data saved in the respective media. The printer 13 prints specified information, e.g., identification information given for each order on a recording sheet of a specified size and outputting as an order sheet to an orderer. The charge receiving unit 14 receives the payment of charge for the order. The communication unit 15 outputs a control data for instructing an operation of printing the image data or writing the image data in a CD to the digital printer 30 and the CD processing apparatus 20 together with the image data imported from the medium.

The monitor 11 is constructed, for example, by a touch panel unit which is a combination of a touch panel and an LCD (liquid crystal display), and displays various order screens including operation descriptive texts describing a method of inputting a print order and the like and operation keys used to input various operation commands by touching corresponding parts of the order screen. The charge receiving unit 14 for calculating an amount of money inserted through bill and coin slots is formed in the front surface of the casing of the receiving apparatus 10.

The receiving apparatus 10 receives order information inputted on the order screen displayed on the monitor 11, imports image data saved in the medium by means of the image importing unit 12, saves them in a HDD 17 to be described later, and transmits them to the digital printer 30 and the like if necessary.

The CD processing apparatus 20 includes a stocking unit 21 arranged at the front right side of the casing for stocking empty CD-Rs (recordable compact disks) or CD-RWs (rewritable compact disks) (hereinafter, they are collectively referred to as CDs), a CD writer 22 arranged at the front left side of the casing and having a head for writing the image data in the empty CD, a conveying unit 23 having a transverse sliding structure of the vacuum adsorption type for conveying the empty CD from the stocking unit 21 to the CD writer 22, and a control unit (not shown) comprised of a microcomputer for controlling the entire operation of the CD processing apparatus 20, memories and the like.

The digital printer 30 includes magazines 31, 32 containing a plurality of kinds (for example, two kinds) of long printing sheets having different widths in the form of rolls, an exposing unit (not shown) for cutting the printing sheet dispensed from the magazine 31, 32 to a specified size and exposing the cut piece of the printing sheet with image (image data) transmitted from the receiving apparatus 10, a developing unit (not shown) for developing, bleaching, fixing and stabilizing the exposed pieces of the printing sheet, a drying unit 33 for drying the developed pieces of the printing sheet, a sorter 34 for sorting the pieces of the printing sheet after drying according to the order and discharging them, and a control unit (not shown) comprised of a microcomputer for controlling the operation of the entire digital printer 30, memories and the like.

FIG. 2 is a block diagram showing a construction of a control unit 16 of the receiving apparatus 10. The control unit 16 controls the operation of the entire picture processing system. The control unit 16 is provided with an unillustrated CPU (central processing unit), an unillustrated RAM (random access memory) for temporarily saving data being processed, and an unillustrated ROM (read-only memory) storing a program for controlling various operations of the picture processing system, screen data forming various images and other data.

The HDD 17 includes an order information storage 171, a unique information storage 172, an imported image storage 173, a language storage 174, an order screen information storage 177, an order sheet information storage 178, and a charge information storage 179. The order information storage 171 saves order information including the name of an orderer, whether or not prints are ordered, the number of prints to be made, and the print size and saves identification information (hereinafter, "reception ID") assigned to the order information by a reception information assigning section 163 to be described later and reception time information indicating the time of receiving the order in correspondence with the order information. The unique information storage 172 saves the identification information of the receiving apparatus 10 (hereinafter, "terminal ID") and unique information such as the telephone number of a photo laboratory. The imported image storage 173 saves image data imported from the medium. The language storage 174 saves language information selected by a language receiving section 162 to be described later. The order screen information storage 177 saves character string data for operation descriptive texts of the order screens to be displayed on the monitor 11 (hereinafter, also referred to as "operation guiding information"). The order sheet information storage 178 saves character string data representing a document name to be printed on the order sheet and those representing the names of items to be received for the reception information such the reception ID and the terminal ID. The charge information storage 179 saves print unit price information as charge information used to calculate an amount of charge for the order and the type of a currency acceptable by the charge receiving unit 14 (hereinafter, "currency type information") and saves charge amount information calculated from the print unit price and the number of prints to be made.

The language storage 174 is comprised of a first language storage 175 for saving local language information representing a local language which is a language spoken in the place where the apparatus main body is installed, and a second language storage 176 for saving display language information representing a display language on the order screens to be displayed on the monitor 11 and on the order sheet outputted by the printer 13.

Figure 3:
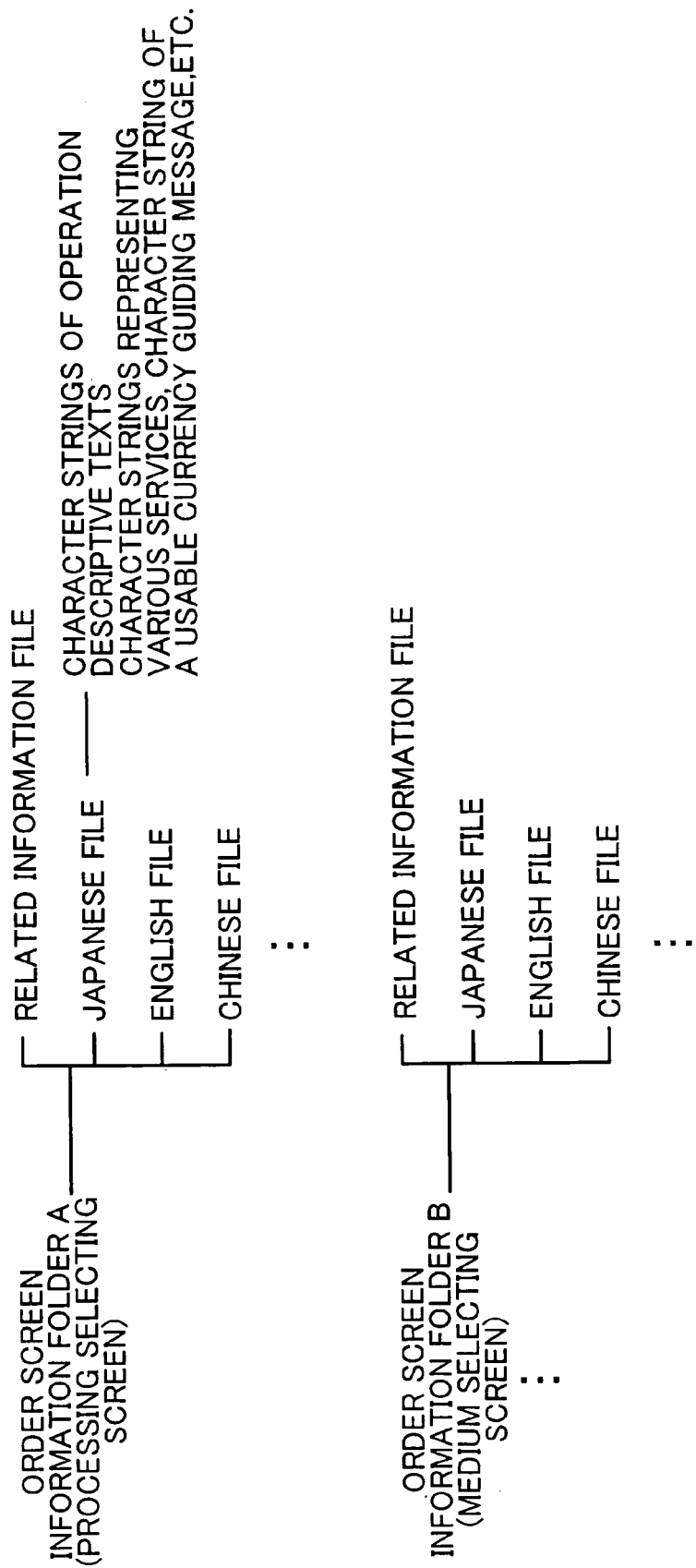
FIG. 3 is a diagram showing data construction of an order screen information folder saved in an order screen information storage.

FIG. 3 is a data configuration diagram of an order screen information folder saved in the order screen information storage 177. A plurality of order screen information folders A, B, . . . containing operation guide information for the respective order screens are saved in the order screen information storage 177. Each order screen information folder is comprised of a plurality of language files including character string data of the operation descriptive texts in the respective languages and a related information file containing related information such as the arrangement of character strings on the monitor 11. For example, character string data representing various services such as the printing and the image storage in a CD and character string data of a usable currency guiding message for guiding the type of usable currency are included in the language files of the order screen information folder for the processing selecting screen G2 used to receive the selection of a service content.

Figure 4:
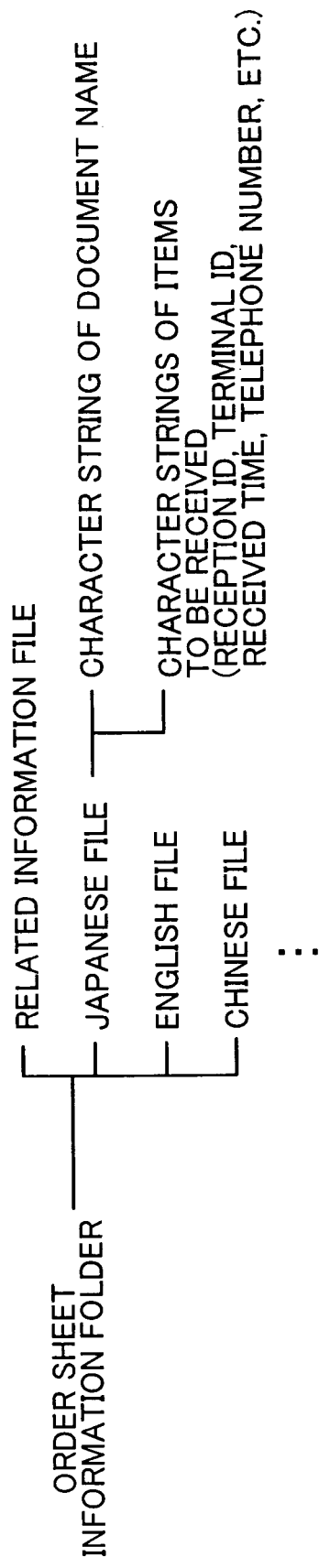
FIG. 4 is a diagram showing data construction of an order sheet information folder saved in an order sheet information storage.

FIG. 4 is a data configuration diagram showing one example of the order sheet information folder saved in the order sheet information storage 178. The order sheet information folder is comprised of a plurality of language files including character string data of the names of documents and the names of items to be received prepared in the respective languages, and a related information file including related information such as the arrangement and size of the character string data.

Referring back to FIG. 2, the control unit 16 is provided with a reception processing section 161, a language receiving section 162, the reception information assigning section 163, a language selecting screen displaying section 164, an order screen displaying section 165, a processing controlling section 166, an order sheet issuance controlling section 167 and a charge calculating section 169. The reception processing section 161 receives various instructions concerning the printing operation and a CD preparing operation, the instructions being inputted via the order screens on the monitor 11. Specifically, the reception 161 receives the order information such as the presence or absence of a print request or a CD preparation request, the print size, the number of prints to be made and the selection of the medium, and saves this order information in the order information storage 171. Further, the reception processing section 161 receives image data imported from the medium by the image importing unit 12 and saves them in the imported image storage 173.

The language receiving section 162 saves the selected local language information in the first language storage 175 upon receiving the selection of the local language via the order screen on the monitor 11 while saving the selected display language information in the second language storage 176 upon receiving the selection of the display language via the order screen on the monitor 11.

The reception information assigning section 163 generates a reception ID in accordance with a specified rule every time the order information is received by the reception processing section 161, generates reception time information indicating the time of receiving the order information, this time being obtained from a time measuring section (not shown) for obtaining a present time, and saves the reception ID and the reception time information in the order information storage 171 in correspondence with the order information. Here, the reception ID is a four-digit integer, and the reception information assigning section 163 has a built-in counter and assigns the identification information, which is a four-digit serial number, to each order by incrementing the count value of the counter in the order of receiving the order information.

The language selecting screen displaying section 164 causes the monitor 11 to display a language selecting screen displaying character strings for guiding the selection of the display language on the monitor 11 in the respective languages. The order screen displaying section 165 reads the character string data of the operation descriptive text in the language selected on the language selecting screen from the order screen information storage 177 and causes it to be displayed on the monitor 11. The order screen displaying section 165 causes the type of the currency usable in this apparatus to be displayed as one example of the operation descriptive text.

The processing controlling section 166 outputs an instruction signal for instructing the printing operation or the image storage in a CD to the digital printer 30 and the CD processing apparatus 20 together with the image data saved in the imported image storage 173 in accordance with the order information received by the reception processing section 161.

The order sheet issuance controlling section 167 includes an image generating section 168 for generating a print data of the order sheet from the reception information saved in the order information storage 171 and the unique information saved in the unique information storage 172, and outputs the print data of the order sheet generated by the image generating section 168 to the printer 13 together with the print instruction.

The image generating section 168 extracts the folder of the display language designated by the language receiving section 162 and the local language folder from the order sheet information folder saved in the order sheet information storage 178; obtains the character string data of the document name and the names of the items to be received from the respective language folders; obtains the reception ID and the reception time information saved in the order information storage 171 in correspondence with the order information received this time and the unique information such as the terminal ID and the telephone number saved in the unique information storage 172; and generates a print data in which the character strings of the document name in the display language and the local language are written together and the character strings of the names of items to be received in the display language and the local language and the corresponding reception information are written together.

The image generating section 168 also judges whether the display language designated by the language receiving section 162 and the local language agree; and extracts the folder of the designated language from the order sheet information folder saved in the order sheet information storage 178 and generates a print data in which the character string of the document name in the designated language is included and the character strings of the names of the items to be received in the designated language and the corresponding reception information are written together.

The charge calculating section 169 calculates an amount of the charge using a total number of prints received by the reception processing section 161 to be made and the print unit price information saved in the charge information storage 179, and saved the calculated charge amount information in the charge information storage 179. The charge calculating section 169 also permits the processing controlling section 166 and the like to perform various processings when the charge amount calculated by the charge calculating section 169 is calculated by the charge receiving unit 14.

Figure 5:
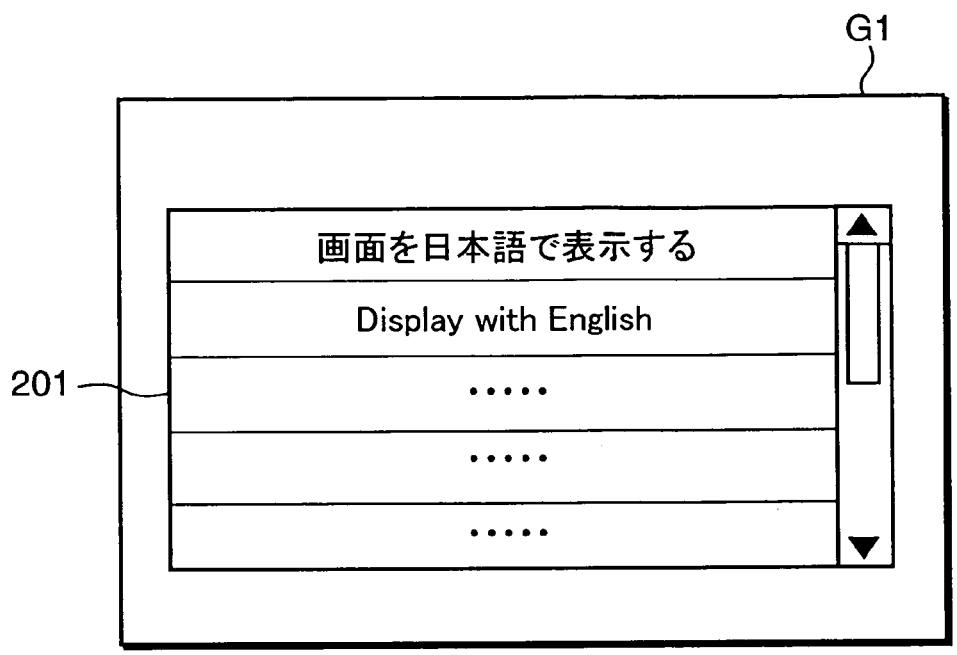
FIG. 5 is a diagram showing a language selecting screen to be displayed on a monitor.

Next, examples of the order screens to be displayed on the monitor 11 when the print order is received by the receiving apparatus 10 are described with reference to FIGS. 5 to 9. FIG. 5 is a diagram showing one example of the language selecting screen used to select the display language of the monitor 11. On a language selecting screen G1, messages "Screen is displayed in XXX language" are displayed in the respective languages, and the display language is selected on the order screens by selecting a display area of any one of the messages. When the display language is selected, the display language information selected by the language receiving section 162 is saved in the second language storage 176. Character strings of the operation descriptive texts to be displayed on the monitor 11 thereafter are displayed in the display language.

It should be noted that the same screen as the language selecting screen G1 is displayed on the monitor 11 if the setting of the local language is selected on an environment setting screen (not shown) to be displayed on the monitor 11 when this apparatus is installed. When the local language is selected on the screen, the local language information selected by the language receiving section 162 is saved in the first language storage 175.

Figure 6:
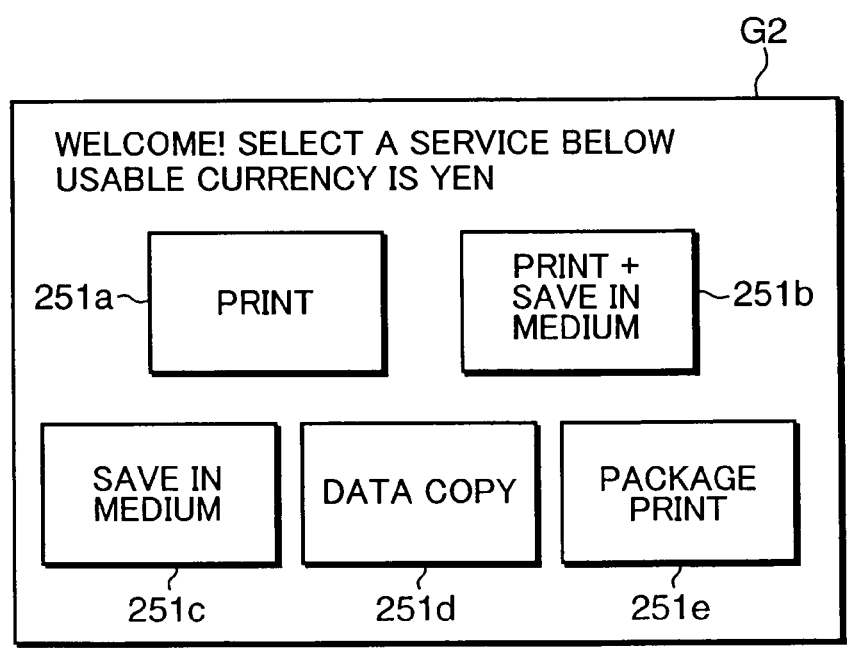
FIG. 6 is a diagram showing a processing selecting screen to be displayed on the monitor.

FIG. 6 is a diagram showing a processing selecting screen G2 to be displayed on the monitor 11 upon selecting the display language. Selection keys 251a to 251e for selecting any one of services such as an operation of printing the image data and an operation of storing the image data in a CD are displayed on the processing selecting screen G2. Here, the character strings of the operation descriptive texts are displayed in the display language selected on the language selecting screen G1, for example, in Japanese. A message for guiding the type of the usable currency, e.g., "Usable currency is yen" is displayed at a specified part of the screen, e.g., at an upper part of the screen.

FIG. 7 is a diagram showing a medium selecting screen to be displayed on the monitor 11. A medium selecting screen G3 is provided with medium selection keys 301a to 301d for selecting a medium from which images are to be imported from a plurality of types of media such as a CD-R/RW, a compact flash, a MO and a memory stick, an OK key 302 for confirming the selection of the medium, a cancel key 303 for canceling the selection of the medium, and a stop key 304 for canceling a series of operations and returning the display screen of the monitor 11 to the language selecting screen G1. When any one of the medium selection keys 301a to 301d is pressed down on the medium selecting screen G3, this medium selection key has its display mode changed, for example, has the outer frame thereof changed to a solid-line one in order to show to have been selected. Simultaneously, the medium information for specifying the type of the medium selected by the reception processing section 161 is saved in the order information storage 171.

FIG. 8 is a diagram showing an image listing screen to be displayed on the monitor 11 when the OK key 302 is selected on the medium selecting screen G3. On the image listing screen G4 are displayed thumbnail image data 351*a* to 351*f* of the respective images imported from the medium and print number setting portions 352*a* to 352*f*, which are displayed below the corresponding image data 351*a* to 351*f* and include number setting keys for setting the numbers of prints to be made from the respective images and number displaying portions for displaying the set numbers of prints to be made. Further, a determine key 353 used to input a print instruction for the image data 351*a* to 351*f* and a stop key 354 for canceling a series of operations and returning the display screen of the monitor 11 to the language selecting screen G1 are displayed on the image listing screen G4. When the determine key 353 is pressed down with the numbers of prints to be made from the respective images set by the print number setting portions 352*a* to 352*f*, print number information of each image is saved in the order information storage 171.

FIG. 9 is a diagram showing a charge calculating screen to be displayed on the monitor 11 when the determine key 353 is selected on the image listing screen G4. On the charge calculating screen G5 are displayed contents of the order, for example, file names 401 of the images instructed to be printed, numbers 402 of the prints instructed to be made from the respective images and a total number 403 of the prints to be made from the respective images, and a charge amount 404 calculated from the total number of the prints and the print unit price. Further, a stop key 405 for canceling the inputted order and returning the display screen of the monitor 11 to the language selecting screen G1 is displayed at a bottom part of the screen.

Figure 11:
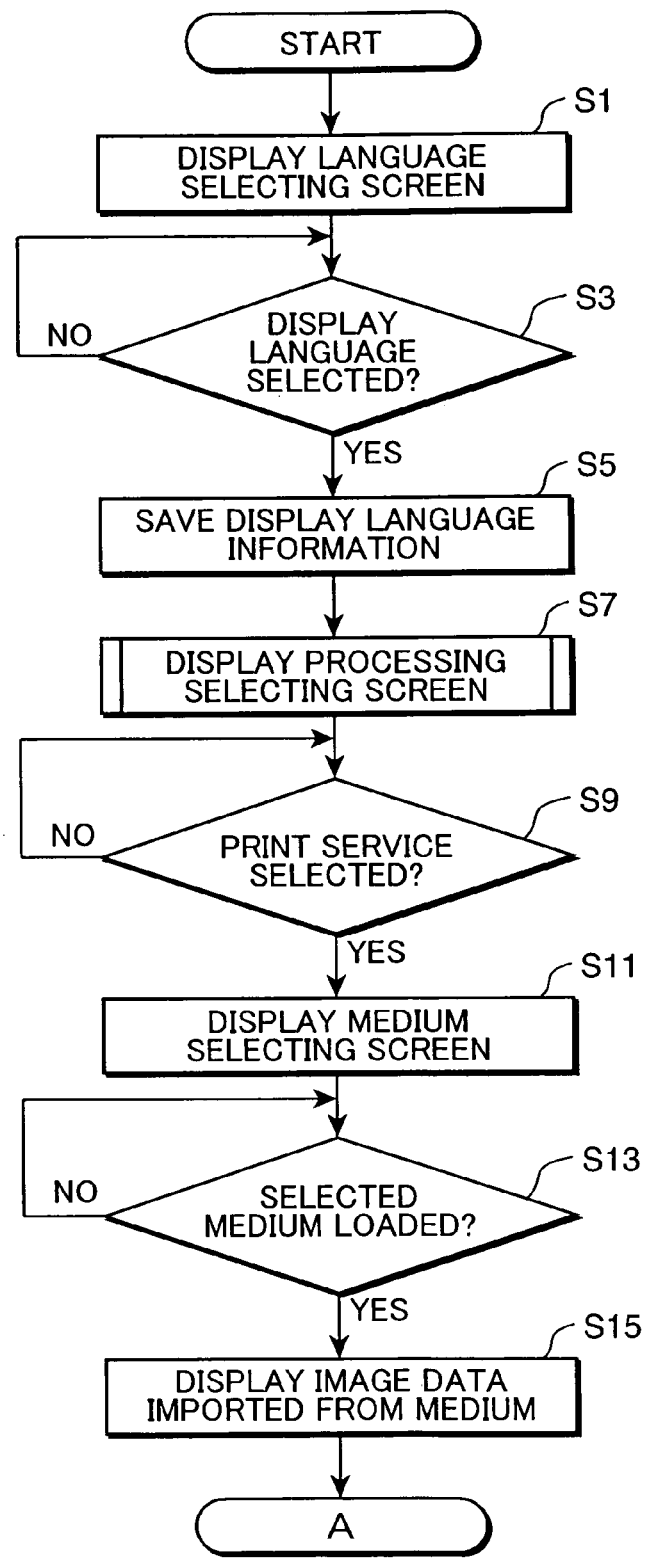
FIGS. 11 and 12 are a flowchart showing a processing by the control unit when a print service is selected via the monitor.
Figure 12:
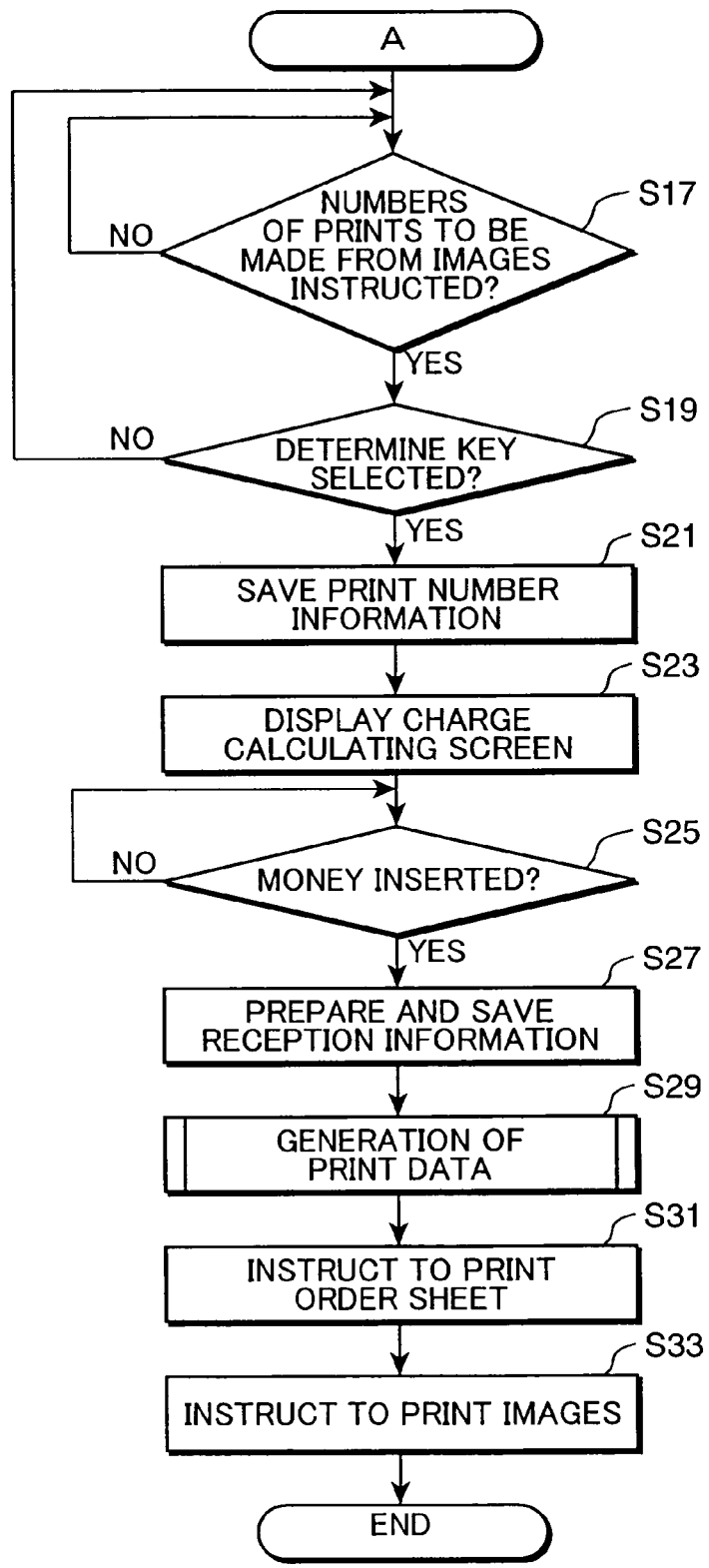

FIGS. 11 and 12 are a flow chart showing one example of the processing of the control unit 16 when the print service is selected via the monitor 11. First, the language selecting screen G1 is displayed on the monitor 11 (Step S1). Whether or not the display language has been selected is judged by the reception processing section 161 (Step S3), and the identification information of the language selected by the language receiving section 162 is saved in the second language storage 176 (Step S5) if the display language has been selected.

Subsequently, the processing selecting screen G2 is displayed on the monitor 11 (Step S7). It is judged whether or not any one of various services has been selected on the processing selecting screen G2 (Step S9), and the medium selecting screen G3 is displayed on the monitor 11 (Step S11) if one service, e.g., the print service has been selected. It is further judged whether or not the medium selected on the medium selecting screen G3 has been loaded in the image importing unit 12 (Step S13). If the medium is loaded, the image data are imported from the medium by the image importing unit 12 and the imported image data are listed on the monitor 11 (Step S15).

Subsequently, whether or not the numbers of prints to be made from the respective images are designated by means of the print number setting portions 352*a* to 352*f* is judged by the reception processing section 161 (Step S17). With the print numbers designated, whether or not the determine key 353 has been selected is further judged by the reception processing section 161 (Step S19). If the determine key 353 has been selected, the print number information of each image is saved in the order information storage 171 by the reception processing section 161 (Step S21).

The charge calculating section 169 calculates the charge amount using the print number information saved in the order information storage 171 and the print unit price information saved in the charge information storage 179, and the charge calculating screen G5 is displayed on the monitor 11 (Step S23). Then, whether or not the calculated amount by the charge receiving unit 14 has reached the charge amount is judged by the charge calculating section 169 (Step S25). When the calculated amount by the charge receiving unit 14 reaches the charge amount, a permission signal for permitting the printing operation is outputted to the reception information assigning section 163, the order sheet issuance controlling section 167 and the processing controlling section 166 by the charge calculating section 169.

Upon receiving this permission signal, the reception information assigning section 163 generates a reception ID and received time information for the order information received this time and saves them in the order information storage 171 in correspondence with the order information (Step S27). The order sheet issuance controlling section 167 generates a print data of the order sheet (Step S29), and a printing operation of printing the generated print data of the order sheet is instructed to the printer 13 (Step S31). Further, the printing operation of printing the image data imported from the medium is instructed to the digital printer 30 (Step S33).

Figure 13:
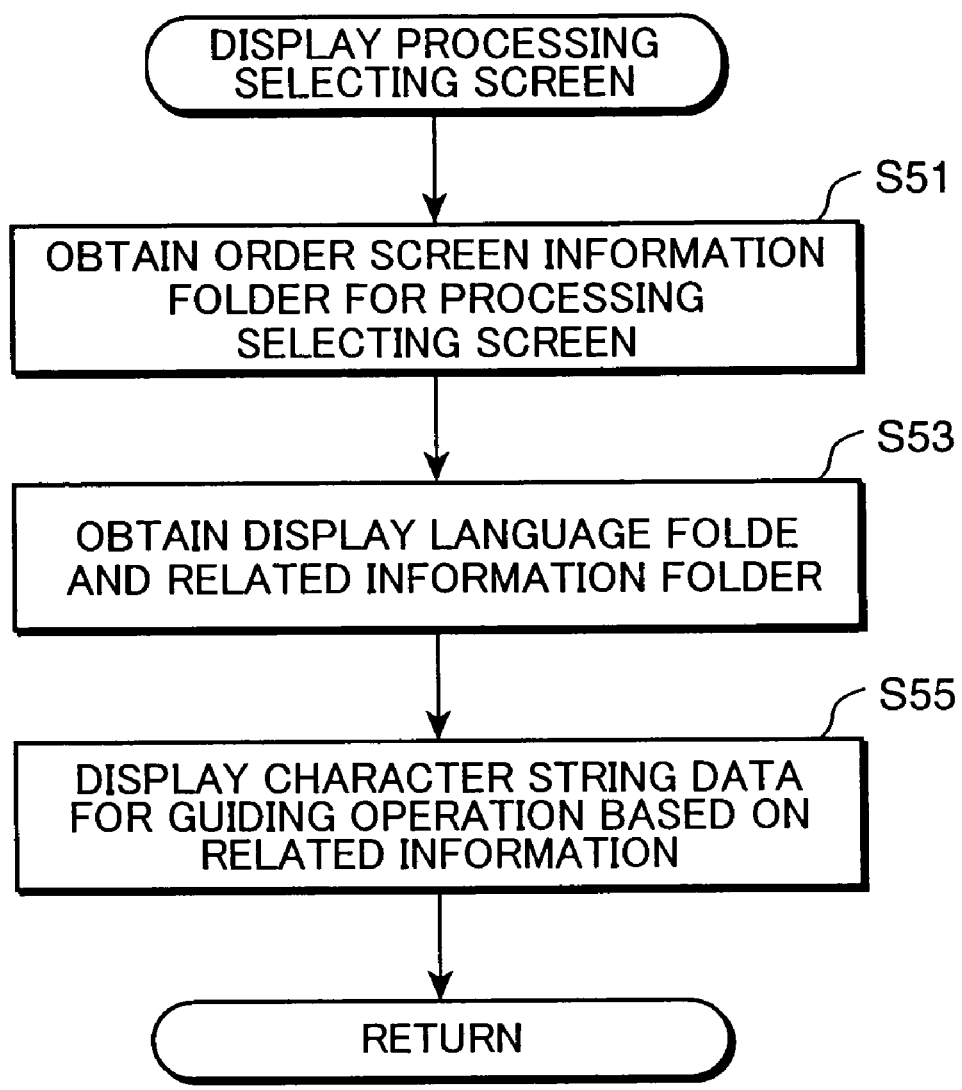
FIG. 13 is a flow chart showing a processing of a display controlling section when the processing selecting screen is displayed on the monitor.

FIG. 13 is a flow chart showing the processing of the order screen displaying section 165 when the processing selecting screen G2 is displayed on the monitor 11. First, the order screen information folder A of the processing selecting screen is obtained from the order screen information storage 177 (Step S51), and the file of the designated display language and the related information file are extracted from the order screen information folder A of the processing selecting screen (Step S53). Subsequently, the character string data of the operation descriptive texts included in the display language file, i.e., character string data representing various services and character string data of the usable currency guiding message, etc. are displayed on the monitor 11 in specified arrangement and size based on the related information included in the related information file (Step S55).

Figure 14:
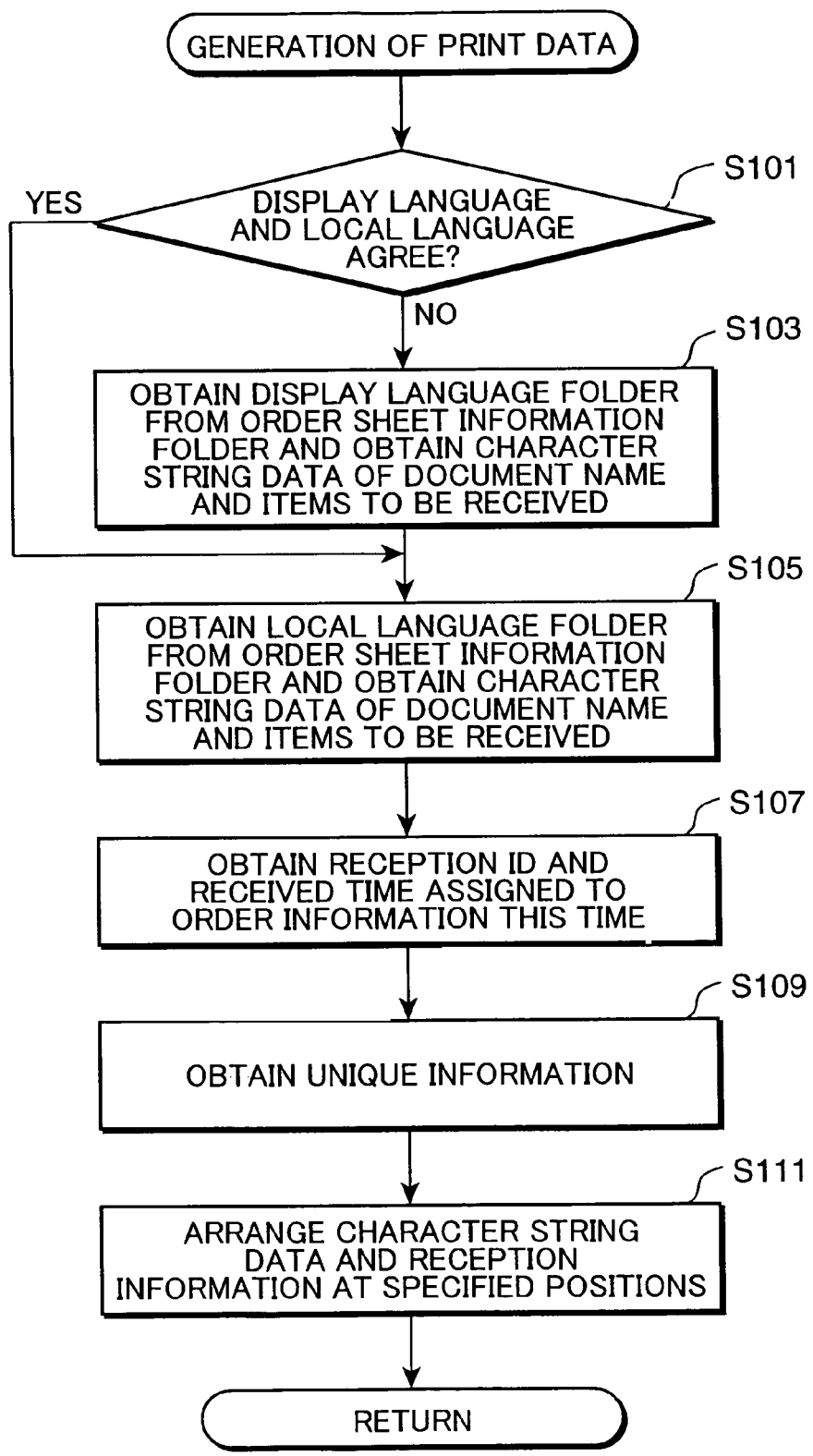
FIG. 14 is a flow chart showing a processing of generating a print data by an image generating section.

FIG. 14 is a flow chart showing the processing of generating the print data by the image generating section 168. First, it is judged whether or not the designated display language and the local language agree (Step S101). If the two languages do not agree, the file of the designated display language is extracted from the order sheet information folder and the character string data of the document name and the names of items to be received in the display language are obtained from this folder (Step S103). Likewise, the folder of the designated local language is extracted from the order sheet information folder, and the character string data of the document name and the names of items to be received in the local language, are obtained from this folder (Step S105). On the other hand, if the display language and the local language agree, the folder of the designated local language is extracted from the order sheet information folder, and the character string data of the document name and the names of items to be received in the local language, are obtained from this folder (Step S105).

Further, the reception ID and the received time information assigned to the order information received this time are read from the order information storage 171 (Step S107) and the unique information such as the terminal ID and the telephone number are read from the unique information storage 172

(Step S109). Then, there is generated a print data in which the character string data of the respective document names and the names of the items to be received and the reception information such as the reception ID are arranged at specified positions, i.e., a print data in which the character strings of the document names in the display language and the local language are written together and the character strings of the items to be received in the display language and the local language and the corresponding reception information are written together or, if the display language and the local language agree with each other, a print data in which the character string of the document name in the designated language is included and the character strings of the respective items to be received in the designated language and the corresponding reception information are written together (Step S111).

FIG. 10 is a diagram showing one example of the order sheet outputted from the printer 13. On an order sheet 500 are printed character strings 505 to 505 of the document name and the respective items to be received in the display language and the local language designated by the user, and the reception information including a reception ID 506, a terminal ID 507, a received time information 508 and a telephone number 509 corresponding to the respective items to be received. Here, the selected display language is English and the local language is, for example, Japanese. Accordingly, foreign travelers can understand the contents of the order sheet, for example, upon using the print service at photo laboratories during their stay in Japan. Further, not only the travelers, but also clerks at the photo laboratories can understand the order sheet information, therefore pictures can be smoothly handed over in exchange for the order sheet.

As described above, since the character strings of the operation descriptive texts on the order screens are written in the designated display language, for example, in the native language of the foreign traveler, the operation descriptive texts such as the print order can be understood and various services such as a picture printing service can be used regardless of the native language of an orderer. Further, since the message guiding the type of the usable currency is displayed on the monitor 11 as the operation guide information before the input of the order information, an inconvenience of letting the orderer notice that he cannot use the service because he does not possess the usable currency first at the stage of paying the charge can be avoided.

Furthermore, since the information is printed in both the display language designated by the orderer and the local language on the order sheet issued to the orderer, not only the travelers, but also clerks at the photo laboratories can understand the contents of the order sheet. Therefore, the pictures can be smoothly handed over.

A novel picture order receiving apparatus comprises: an input unit, a monitor for displaying images, and a loading unit for accepting an external storage medium having image data relating to photographing recorded therein. An operation of receiving an order to record the image data recorded in the external storage medium in another type of a storage medium by means of the input unit is displayed as an operation descriptive text on the monitor. The picture order receiving apparatus is further provided with an operation descriptive text storage device for saving the operation descriptive texts prepared in a plurality of languages; a selecting screen displaying device for displaying a language selecting screen on the monitor; and an operation screen displaying device for reading the operation descriptive text in the language selected by the input unit from the operation descriptive text storage device and displaying it on the monitor.

With such a picture order receiving apparatus, the language selecting screen is displayed on the monitor by the selecting screen displaying device upon receiving an order via the input unit. When the language is selected by the input unit, the operation descriptive text prepared in the selected language is read from the operation descriptive text storage device and displayed on the monitor by the operation screen displaying device. Thus, the operation descriptive text can be displayed, for example, in the native language of an order.

Since the operation descriptive text is displayed on the monitor in the language selected by the orderer, the operation descriptive text such as a print order can be understood and various services can be used even if the orderer is, for example, a foreign traveler.

Preferably, the selecting screen displaying device may display a list of character strings for guiding the selection of the language in the respective languages.

With this construction, since character strings for guiding the selection of the language are listed on the monitor in the respective languages by the selecting screen displaying device, the language conforming to the native language of the orderer can be selected.

Preferably, the picture order receiving apparatus may be further provided with a charge calculator for calculating a charge corresponding to the content of the order, and a currency type storage device for saving the type of a currency usable at the time of paying the charge, and the operation screen displaying device displays the type of the currency on the monitor.

With this construction, the charge corresponding to the content of the order is calculated by the charge calculator, and the type of the currency usable at the time of paying the charge is displayed on the monitor by the operation screen displaying device. Thus, an inconvenience of letting the orderer notice that he cannot use the service because he does not possess the usable currency first at the stage of paying the charge can be avoided.

Preferably, the picture order receiving apparatus may be further provided with an issuing unit for issuing an order sheet for the order, and a local language storage device in which a local language spoken in the place of installation of an apparatus main body is set, and the issuing unit generates an order sheet written in the local language and the selected language.

With this construction, when the local language spoken in the place of installation of the apparatus main body is selected by the input unit, the local language is set in the local language storage device. Since the order sheet written in the local language and the selected language is issued by the issuing unit, both the orderer and a clerk at a photo laboratory or the like where the apparatus main body is installed can understand the contents of the order sheet if the orderer is, for example, a foreign traveler. Therefore, pictures prepared upon the order can be smoothly handed over.

Preferably, the issuing unit may judge whether or not the local language and the selected language agree and prepares the order sheet in one language if the two languages agree.

With this construction, the issuing unit judges whether or not the local language and the selected language agree and prepares the order sheet in one language if these two languages agree. This can prevent the character string of the same content from being repeatedly written.

Also, a novel picture processing system comprises the above-mentioned novel picture order receiving apparatus, and an image recording device for reading image data recorded in the external storage medium loaded in the loading unit and recording them in another type of a recording medium.

With such a picture processing system, when an order is received by the picture order receiving apparatus, image data recorded in the external storage medium loaded in the loading unit are read and rerecorded in another type of a recording medium such as a printing sheet or a CD or a like electronic recording medium by the image recording device. Thus, there can be obtained the recording medium such as a CD in which picture and/or image data are recorded.

This application is based on patent application No. 2004-262660 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A picture order receiving apparatus, comprising:
   an input unit;
   a monitor for displaying images;
   a loading unit for accepting an external storage medium having image data relating to photographing recorded therein;
   an operation descriptive text storage device for saving operation descriptive texts prepared in a plurality of languages including a local language spoken in a place of installation of an apparatus main body, the operation descriptive text being displayed on the monitor to show an operation of receiving an order to record the image data recorded in the external storage medium in another type of a storage medium by means of the input unit;
   a selecting screen displaying device for displaying a language selecting screen on the monitor;
   a first language storage for storing a selected local language information;
   a second language storage for storing a selected display language information;
   a language receiving section for saving the selected local language information in the first language storage upon receiving the selection of the local language via the selecting screen displaying device and saving the selected display language information in the second language storage; and
   an operation screen displaying device for reading the operation descriptive text in the language selected by the input unit from the operation descriptive text storage device and displaying it on the monitor.

2. A picture order receiving apparatus according to claim 1, wherein the selecting screen displaying device displays a list of character strings for guiding the selection of the language in the respective languages.

3. A picture order receiving apparatus according to claim 2, further comprising:
   a charge calculator for calculating a charge corresponding to the content of the order; and
   a currency type storage device for saving the type of a currency usable at the time of paying the charge,
   wherein the operation screen displaying device displays the type of the currency on the monitor.

4. A picture order receiving apparatus according to claim 3, further comprising:
   an issuing unit for issuing an order sheet for the order; and
   a local language storage device in which the local language spoken in the place of installation of the apparatus main body is set,
   wherein the issuing unit generates an order sheet written in the local language and the selected language.

5. A picture order receiving apparatus according to claim 4, the issuing unit judges whether or not the local language and the selected language agree and prepares the order sheet in one language if the two languages agree.

6. A picture order receiving apparatus according to claim 2, further comprising:
   an issuing unit for issuing an order sheet for the order; and
   a local language storage device in which the local language spoken in the place of installation of the apparatus main body is set,
   wherein the issuing unit generates an order sheet written in the local language and the selected language.

7. A picture order receiving apparatus according to claim 1, further comprising:
   a charge calculator for calculating a charge corresponding to the content of the order; and
   a currency type storage device for saving the type of a currency usable at the time of paying the charge,
   wherein the operation screen displaying device displays the type of the currency on the monitor.

8. A picture order receiving apparatus according to claim 1, further comprising:
   an issuing unit for issuing an order sheet for the order; and
   a local language storage device in which the local language spoken in the place of installation of the apparatus main body is set,
   wherein the issuing unit generates an order sheet written in the local language and the selected language.

9. A picture processing system, comprising:
   a picture order receiving apparatus including:
      an input unit;
      a monitor for displaying images;
         a loading unit for accepting an external storage medium having image data relating to photographing recorded therein;
         an operation descriptive text storage device for saving operation descriptive texts prepared in a plurality of languages including a local language spoken in a place of installation of an apparatus main body, the operation descriptive text being displayed on the monitor to show an operation of receiving an order to record the image data recorded in the external storage medium in another type of a storage medium by means of the input unit;
         a selecting screen displaying device for displaying a language selecting screen on the monitor;
         a first language storage for storing a selected local language information;
         a second language storage for storing a selected display language information;
         a language receiving section for saving the selected local language information in the first language storage upon receiving the selection of the local language via the selecting screen displaying device and saving the selected display language information in the second language storage; and
         an operation screen displaying device for reading the operation descriptive text in the language selected by the input unit from the operation descriptive text storage device and displaying it on the monitor;

an image recording device for reading image data recorded in the external storage medium loaded in the loading unit and recording them in another type of a recording medium.

10. A picture order receiving system according to claim 9, wherein the selecting screen displaying device displays a list of character strings for guiding the selection of the language in the respective languages.

11. A picture order receiving system according to claim 10, further comprising:
- a charge calculator for calculating a charge corresponding to the content of the order; and
- a currency type storage device for saving the type of a currency usable at the time of paying the charge,
- wherein the operation screen displaying device displays the type of the currency on the monitor.

12. A picture order receiving system according to claim 11, further comprising:
- an issuing unit for issuing an order sheet for the order; and
- a local language storage device in which the local language spoken in the place of installation of the apparatus main body is set,
- wherein the issuing unit generates an order sheet written in the local language and the selected language.

13. A picture order receiving system according to claim 12, the issuing unit judges whether or not the local language and the selected language agree and prepares the order sheet in one language if the two languages agree.

14. A picture order receiving system according to claim 10, further comprising:
- an issuing unit for issuing an order sheet for the order; and
- a local language storage device in which the local language spoken in the place of installation of the apparatus main body is set,
- wherein the issuing unit generates an order sheet written in the local language and the selected language.

15. A picture order receiving system according to claim 9, further comprising:
- a charge calculator for calculating a charge corresponding to the content of the order; and
- a currency type storage device for saving the type of a currency usable at the time of paying the charge,
- wherein the operation screen displaying device displays the type of the currency on the monitor.

16. A picture order receiving system according to claim 9, further comprising:
- an issuing unit for issuing an order sheet for the order; and
- a local language storage device in which the local language spoken in the place of installation of the apparatus main body is set,
- wherein the issuing unit generates an order sheet written in the local language and the selected language.

* * * * *